No. 654,519. Patented July 24, 1900.
C. J. COLEMAN.
SECONDARY BATTERY.
(Application filed Oct. 2, 1899.)

(No Model.)

Attest
Harry D. White
R. White

Inventor:
Clyde J. Coleman,
By Robert Burns Atty.

THE NORRIS PETERS CO., PHOTO-LITHO., WASHINGTON, D. C.

UNITED STATES PATENT OFFICE.

CLYDE J. COLEMAN, OF CHICAGO, ILLINOIS, ASSIGNOR TO THOMAS J. RYAN, OF NEW YORK, N. Y.

SECONDARY BATTERY.

SPECIFICATION forming part of Letters Patent No. 654,519, dated July 24, 1900.

Application filed October 2, 1899. Serial No. 732,354. (No model.)

*To all whom it may concern:*

Be it known that I, CLYDE J. COLEMAN, a citizen of the United States, and a resident of Chicago, in the county of Cook and State of Illinois, have invented certain new and useful Improvements in Secondary Batteries; and I do hereby declare the following to be a full, clear, and exact description of the same, reference being had to the accompanying drawings, forming a part of this specification.

The present invention relates to that type of secondary batteries in which the active material in a loosely-coherent state surrounds a central conduction-core that has conductive connection with the supporting strip or bar of the battery-electrode.

The object of the present improvement is to provide a simple and efficient construction and arrangement of the electrode parts adapted to afford great durability, lightness, and efficiency to the battery, all as will hereinafter more fully appear and be more particularly pointed out in the claims.

Figure 1:
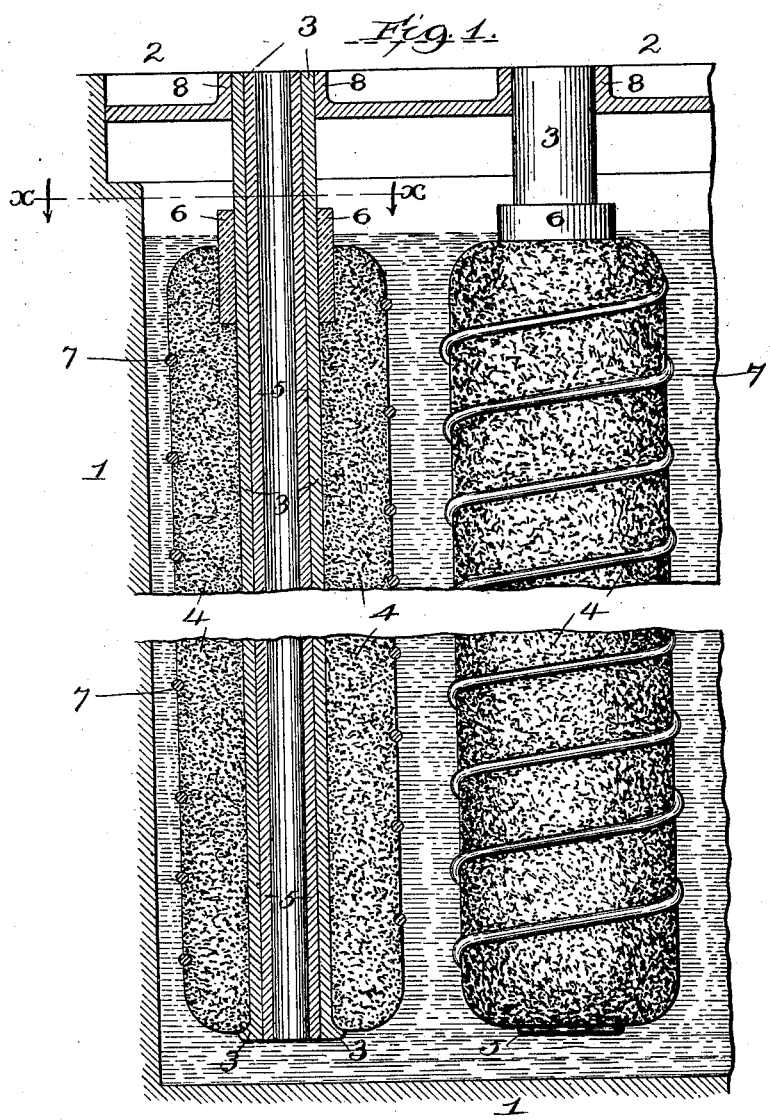
Figure 2:
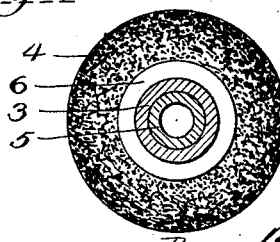

In the accompanying drawings, illustrative of the present invention, Figure 1 is a fragmentary view, partly in section and partly in elevation, of a secondary-battery electrode embodying the present invention; Fig. 2, a detail horizontal section at line *x x*, Fig. 1.

Similar numerals of reference indicate like parts in both views.

Referring to the drawings, 1 represents a portion of the battery cell or casing, and 2 the connecting strip or bar, by which the series of cores 3, that support the coating 4, of active material, are electrically connected together in manner hereinafter more fully described to constitute a secondary-battery electrode.

The first part of the present invention involves, broadly, the formation of a secondary-battery electrode of a series of small or sub electrodes connected together by a connecting bar or strip common to the series, each of said smaller electrode-sections comprising a supporting-core of conductive material and a coating of active material surrounding said core.

Another part of the present improvement involves the formation of the supporting-cores 3 of a tubular form and the arrangement within the bore thereof of a supporting tube or rod 5, of glass or other like non-corrodible material, to constitute a support for such tubular core and impart the required stiffness and strength thereto. The lower end of the tubular cores will preferably have their lower ends formed with outwardly-projecting flanges 3 to assist in retaining the coating 4, of active material, in place.

Another part of the present improvement involves the provision of a tubular section or collar 6, of glass or other like non-corrodible material, surrounding the core 3 and arranged to project some distance into the active coating 4 and some distance above the same, as shown in Fig. 1 of the drawings, the purpose being to prevent any corroding action of the electrolyte upon the tubular supporting-core at the surface line of the electrolyte and where otherwise the corrosive action of the electrolyte would tend to entirely corrode the support at such point or destroy in a great measure its electrical conductivity.

7 is a retaining-band, of lead, rubber, or like material surrounding the active coating 4, preferably in the spiral manner shown, and adapted to assist in retaining the active coating in place upon its tubular core in the active use of the battery.

The connecting bar or strip 2 in the present improvement will be formed with a series of vertically-extending necks or flanges 8 of an internal diameter corresponding with the external diameter of the tubular cores 3 and adapted to receive the upper ends of such cores and afford an extended surface contact between the parts to afford a substantial mechanical connection combined with a maximum electrical conductive union between the parts, and which conductive union may be still further increased by a fusion together of the upper ends of said flanges 8 and the tubular cores 3, as set forth in my former application for Letters Patent, filed August 3, 1899, Serial No. 726,014.

The connecting bar or strip 2 will preferably be of a channeled formation, as shown in the drawings, as affording strength and lightness combined. No claim is made in the present application to such feature of construction, as the same is involved in the subject-matter of a companion application for Letters Patent filed as of even date herewith.

Having thus fully described my said invention, what I claim as new, and desire to secure by Letters Patent, is—

1. A secondary-battery electrode, comprising in combination, a conducting-support, a coating of active material surrounding the same, and a collar formed of non-corrodible material surrounding said support, and arranged to project a distance into the active coating and a distance above the same, substantially as set forth.

2. A secondary-battery electrode, comprising in combination, a conducting-support, a coating of active material surrounding the same, and a collar formed of non-conducting and non-corrodible material surrounding said support and arranged to project a distance into the active coating and a distance above the same, substantially as set forth.

3. A secondary-battery electrode, comprising in combination a series of electrode-sections, each section comprising a tubular conducting-support, and a coating of active material surrounding the same, and a connecting-bar having a series of openings with thin vertically-extending necks around said openings receiving the upper ends of the tubular conducting-supports, and adapted to afford a convenient means for effecting a fused joint between the parts, substantially as set forth.

In testimony whereof witness my hand this 2d day of September, 1899.

CLYDE J. COLEMAN.

In presence of—
ROBERT BURNS,
HENRY A. NOTT.